United States Patent
Kuehbauch

(12) 
(10) Patent No.: US 6,530,710 B1
(45) Date of Patent: Mar. 11, 2003

(54) JOINT FOR CONNECTING THREE LEVERS

(75) Inventor: Gerd Kuehbauch, Buehlertal (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/674,757

(22) PCT Filed: Feb. 23, 2000

(86) PCT No.: PCT/DE00/00501

§ 371 (c)(1),
(2), (4) Date: Dec. 26, 2000

(87) PCT Pub. No.: WO00/53467

PCT Pub. Date: Sep. 14, 2000

(30) Foreign Application Priority Data

Mar. 8, 1999  (DE) .......................... 199 10 094

(51) Int. Cl.[7] .............................. B60S 1/24; F16C 11/06
(52) U.S. Cl. ......................................... 403/54; 403/133
(58) Field of Search ............................ 403/53, 54, 56, 403/133; 74/42, 43; 15/250.27, 250.31, 250.34; 296/96.15, 96.17

(56) References Cited

U.S. PATENT DOCUMENTS 5,473,955 A    12/1995   Stinson .......................... 74/43

FOREIGN PATENT DOCUMENTS

| DE | 3432809 A1 | * | 3/1986 |
| EP | 0 683 739 B | | 5/1997 |
| FR | 2 222 893 A | | 10/1974 |
| FR | 2 505 952 A | | 11/1982 |

* cited by examiner

*Primary Examiner*—Christopher J. Novosad
(74) *Attorney, Agent, or Firm*—Michael J. Striker

(57) ABSTRACT

The invention is based on a hinge (10) for connecting three levers (12, 14, 16) of a lever mechanism, having a first bearing shell (18) to which a first lever (12) is secured, and in which a second bearing shell (20) is rotatably supported, on which latter bearing shell a second lever (14) is secured. It is proposed that the second bearing shell (20) has two sectors (22, 24), of which a first sector (22) is solidly connected to the second lever (14), and a second sector (24) is solidly connected to a third lever (16), the sectors (22, 24) allowing a limited pivoting motion counter to one another about the common center point (28).

6 Claims, 2 Drawing Sheets

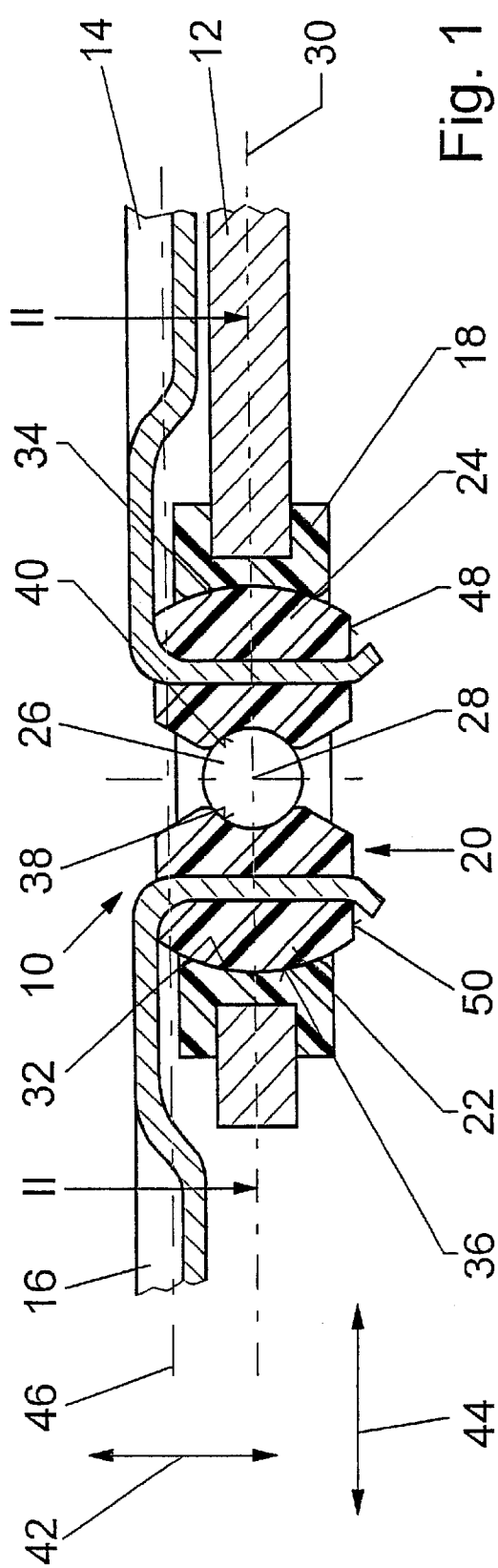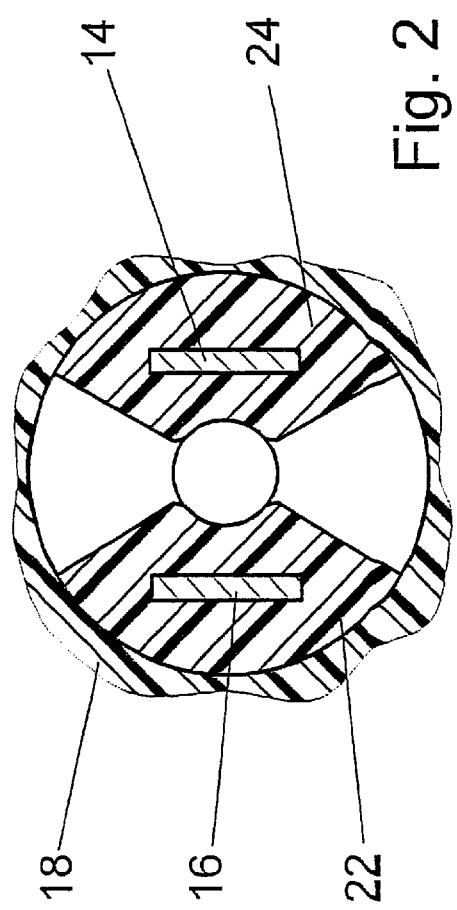

JOINT FOR CONNECTING THREE LEVERS

BACKGROUND OF THE INVENTION

The invention is based on a hinge for connecting three levers [as generically defined by the preamble to claim 1].

Motor vehicle wiper systems have a wiper motor as their drive mechanism, along with a gear mechanism mounted on it whose drive shaft as a rule via a crank and articulated rods drives a crank that is solidly connected to a drive shaft for each windshield wiper.

In conventional wiper systems, a crank is solidly mounted on the drive shaft of the gear mechanism and on its other end has at least one power takeoff mechanism. This power takeoff mechanism forms a hinge, which connects a plurality of levers of a lever mechanism to one another.

From European Patent Disclosure EP 0 683 739 B1, a hinge is known that has a crank secured to a bearing bolt, forming a mechanical unit. The bearing bolt protrudes with its shaft through the crank, while in its end region remote from the crank it changes over into a spherical bolt head. The bolt head is supported at a first bearing ring, which is connected to a first drive rod. The inner bearing face of the first bearing ring is curved to correspond to the spherical surface of the bolt head, on the one hand to allow a pivoting motion of the first drive rod relative to the bolt head and on the other to secure against axial forces. The first bearing ring furthermore has a spherical outer face, which acts as a bearing face for a second bearing ring. This second bearing ring completely surrounds the first bearing ring and is inseparably connected to a second drive rod by casting. The bearing faces facing one another of the bearing rings are rounded in concave and convex form, respectively, and are oriented concentrically to the center point of the bolt head. They thus make possible an at least limited pivoting motion of the drive rods and the crank relative to one another. The two drive rods and the crank engage the bearing elements at various-sized spacings, so that the hinge and the drive rods and the crank are loaded in the region of the hinge by considerable bending moments. Furthermore, the hinge is relatively high in structure. To make it possible for the drive rods of the lever mechanism to be disposed substantially in the same plane, they and possibly the crank must be severely offset-bent.

Exemplary embodiments are also known in which the relationships between the crank and the drive rods are transposed. In all the versions, the drive rods and the crank are connected in three planes with the bearing parts, making for a tall hinge.

SUMMARY OF THE INVENTION

According to the invention, the hinge for connecting three levers of a lever mechanism comprises a first bearing shell to which a first lever is secured. The first bearing shell has an inner face, which acts as a bearing face for a second bearing shell. The second bearing shell comprises two sectors, which are each solidly connected to one lever. The sectors have outer faces through which they are supported and centered in the first bearing shell. Toward the inside, they are braced against one another by suitable bearing means, such as a knife-edge bearing.

Expediently, the bearing shells have spherical bearing faces, so that the levers are at least limitedly pivotable to all sides about the center point of the sphere. In a further feature of the invention, the sectors of the second bearing shell can furthermore have a concentric spherical dome, into which a securing ball is pressed, on which the sectors are braced against one another, so that the levers connected to them are pivotable not only relative to the third lever but also relative to one another in an arbitrary direction. The three levers are centered relative to one another only by the outer faces of the sectors of the second bearing shells and the inner face of the first bearing shell, so that because there are only a few fits, close tolerances among the parts can be adhered to.

The lever connected to the first bearing shell extends in a middle cross-sectional plane of the bearing shells, while the other two levers are located in the same plane, which has a slight spacing from the first lever. This spacing is determined only by the height of the sectors and the height of the levers. The hinge is therefore extremely shallow and is loaded only by slight bending moments. In a feature of the invention, the levers of the hinge are made from sheet metal, and the second and third levers in part have a U-shaped profile. The U-shaped profile lends greater torsional and bending strengths to the levers and requires less use of materials in comparison to solid profiles. The bearing shells comprise plastic and are injection molded onto the associated levers, creating a solid, positive connection. The selected profile of the levers and the materially bonded and optionally positive connected to the bearing shells bring about a favorable transmission of force.

In a further variant of the invention, the hinge comprises a bearing shell to which a first lever is secured. The bearing shell has a spherical inner face, which acts as a bearing face for two sectors that are formed onto the associated levers. The sectors have spherical outer faces and spherical inner faces, which in turn embrace a ball. The bearing shell is expediently of plastic and is injection molded onto the associated lever. In this variant, the second bearing shell is formed in a simple way by the sectors, which are formed directly onto the sheet-metal levers. Further advantages will become apparent from the ensuing description of the drawing.

BRIEF DESCRIPTION OF THE DRAWINGS

In the drawing, exemplary embodiments of the invention are shown. The drawing, specification and claims include numerous characteristics in combination. One skilled in the art will expediently consider the characteristics individually as well and combine them into suitable further combinations. Shown are:

FIG. 1, a longitudinal section through a hinge according to the invention;

FIG. 2, a section through a hinge along the lines II—II of FIG. 1; and

DESCRIPTION OF THE PREFERRED EMBODIMENTS

Figure 3:
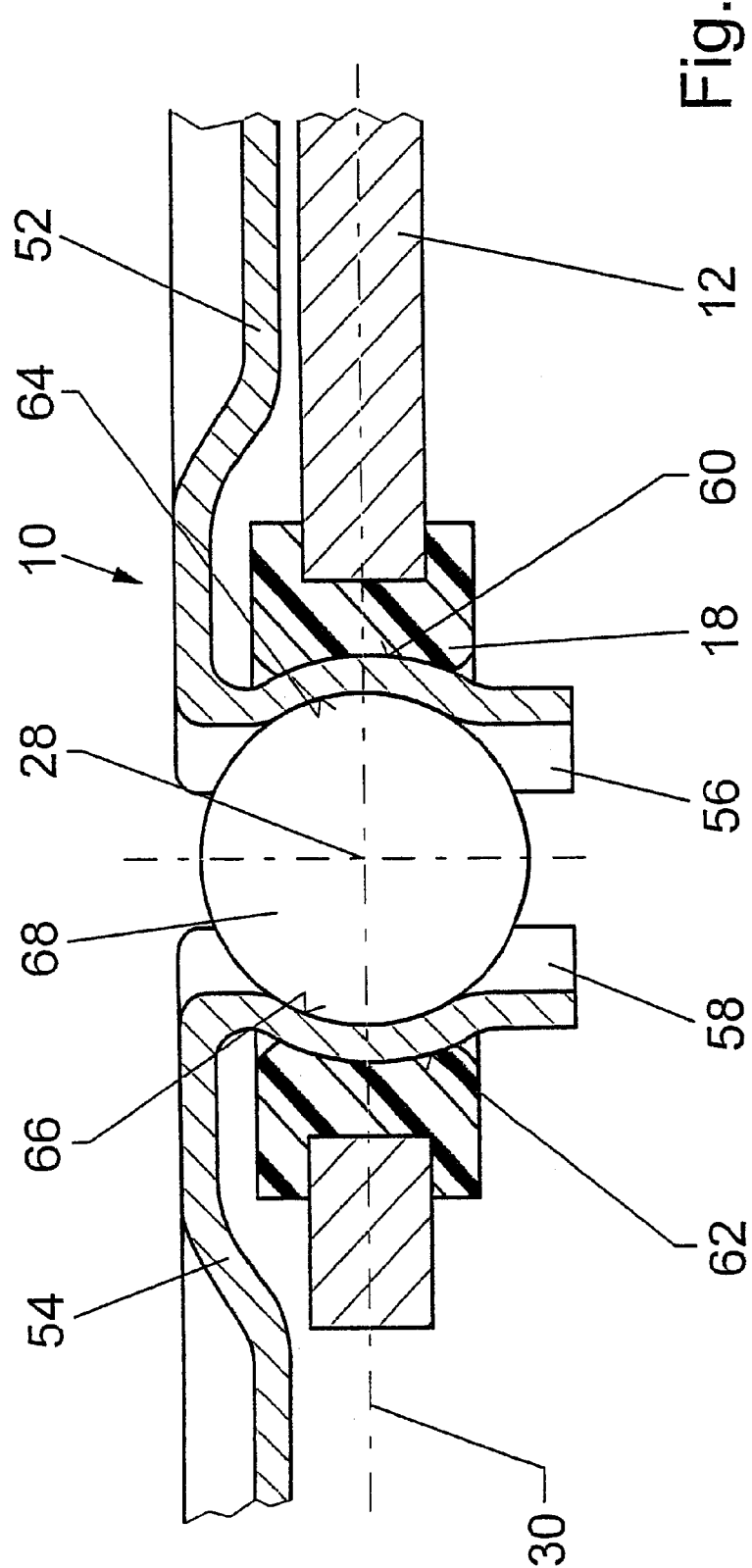
FIG. 3, a variant of FIG. 1.

A hinge 10 according to FIG. 1 comprises a first bearing shell 18, which is solidly connected to a first lever 12, so that these parts form a mechanical unit. The inner face 32 of the first bearing shell 18 is embodied spherically and serves as a bearing face for a second bearing shell 20. This bearing shell comprises a first sector 22, which is solidly connected to a second lever 16, and a second sector 24, which is solidly connected to a third lever 14, and a second sector 24, which is solidly connected to a third lever 14. The sectors 22 and 24 have spherical outer faces 34 and 36, which are adapted to the spherical inner face 32 of the bearing shell 18 in such a way that on the one hand they allow a limited pivoting motion of the levers 14 and 16 about a common center point 28 and on the other they secure the hinge 10 against axial forces that seek to displace the levers 12, 14 and 16 in a longitudinal direction 42.

The sectors 22 and 24 have inner faces 38 and 40, which take the form of a central spherical dome. A securing ball 26 pressed into this spherical dome fixes and secures that components of the hinge 10. If only pivoting motions in one plane are required, then instead of the spherical inner faces 32, 38, 40 and outer faces 34, 36, cylindrical bearing faces can be provided.

The first lever 12 extends in a longitudinal direction 44 in a middle cross-sectional plane 30. It passes through the center point of the securing ball 26, that is, the common center point 28. The other two levers 14 and 16 are located in a common plane 46, which is located in spaced-apart fashion in the longitudinal direction 42 above the middle cross-sectional plane 30.

The bearing shell 18 and the sectors 22 and 24 of the bearing shell 20 are of plastic and are injection molded onto the associated levers 12, 14 and 16. The levers 12, 14 and 16 are of sheet metal, and the levers 14 and 16 in part have a U-shaped profile in the longitudinal direction 44. The injected ends of the levers 14 and 16 penetrate the sectors 22 and 24 at the face ends 48 and 50, where they are also bent at an angle, which additionally strengthens the connection.

FIG. 3 shows a variant of the hinge 10, which comprises a bearing shell 18 to which a first lever 12 is secured. The bearing shell 18 has a spherical inner face 32, which acts as a bearing face for two sectors 56 and 58, which are formed onto the associated sheet-metal levers 52 and 54. Their spherical outer faces 60 and 62 are adapted to the spherical inner face 32 and allow a limited pivoting motion of the levers 52 and 54 about the common center point 28. The spherical inner faces 64 and 66 embrace a securing ball 68 and are lengthened in a straight line at their ends. As a result of the lengthening, exact spherical surfaces can be generated. Here as well, the securing ball 68 fixes and secures the components of the hinge 10 in the axial direction 42.

The disposition of the levers 52 and 54 relative to the lever 12 is equivalent to the first variant. The bearing shell 18 is of plastic and injection molded onto the associated lever. In this variant, a separate, second bearing shell 20 is omitted, since the sectors formed directly onto the sheet-metal levers.

What is claimed is:

1. A hinge (10) for connecting three levers (12, 14, 16) of a lever mechanism, having a first bearing shell (18) to which a first lever (12) is secured, and in which a second bearing shell (20) is rotatably supported, on which latter bearing shell a second layer (16) is secured, characterized in that the second bearing shell (20) has two sectors (22, 24) each limited by a circular arc and two radii, of which a first sector (22) is solidly connected to the second lever (16), and a second sector (24) is solidly connected to a third lever (14), the sectors (22, 24) allowing a limited pivoting motion counter to one another about a common center point (28).

2. The hinge (10) of claim 1, characterizing in that the first and second bearing shells (18, 20) have spherical bearing faces.

3. The hinge (10) of claim 1, characterized in that the sectors (22, 24) of the second bearing shell (20) have a central spherical dome, into which a securing ball (26) is pressed.

4. The hinge (10) of claim 1, characterized in that the first lever (12) extends in a middle cross-sectional plane (30) of the bearing shells (18, 20).

5. The hinge (10) of claim 1, characterized in that at least one bearing shell (18, 20) comprises plastic and is injection molded onto the associated lever (12, 14, 16), which is made from sheet metal.

6. The hinge (10) of claim 1, characterized in that the second and third levers (52, 54) are made from sheet metal, and the sectors (56, 58) of the second bearing shell (20) are formed onto the second and third levers (52, 54).

* * * * *